United States Patent [19]

Andresen

[11] 3,713,320
[45] Jan. 30, 1973

[54] METHOD OF HANDLING METAL STOCK FOR HOT FORGING

[75] Inventor: Arne O. Andresen, Racine, Wis.

[73] Assignee: Walker Forge, Inc., Racine, Wis.

[22] Filed: May 28, 1971

[21] Appl. No.: 148,092

[52] U.S. Cl. .........................72/361, 72/377, 72/422
[51] Int. Cl. ................................................B21j 5/00
[58] Field of Search........72/311, 361, 373, 374, 375, 72/376, 377, 405, 416, 422, 252; 29/418

[56] References Cited

UNITED STATES PATENTS

| | | | |
|---|---|---|---|
| 1,745,214 | 1/1930 | Greve | 72/311 |
| 3,209,578 | 10/1965 | Muller | 72/422 |
| 2,913,936 | 11/1959 | Paetz et al. | 72/252 |
| 1,709,011 | 4/1929 | Fulton | 76/114 |

*Primary Examiner*—Lowell A. Larson
*Attorney*—James E. Nilles

[57] ABSTRACT

A method of precisely cutting to length and then deforming the end of a piece of metal for handling it for insertion into a forging press or the like to form the finished article. The method includes cutting a predetermined piece of metal from a bar of stock, the length of the piece being such that only a minimum excess of length is provided for forming into a gripping portion for handling by a tool such as a pair of tongs. The minimum excess length on the end of the piece is then deformed by squeezing so as to axially elongate it and form it into a gripping portion for a pair of handling tongs. The piece can then be firmly and accurately handled while it is inserted in the forging press, drop hammer or other forging device.

A machine for receiving, holding and deforming a piece of metal which has been heated to a plastic condition, the machine having stop means for holding it against axial shifting in one direction while squeezing jaws of the machine deform the end of the piece into a holding portion. The swingable jaws of the machine are of a shape (1) that precludes axial shifting of the piece in the other direction and (2) that forms the holding portion into a flattened and axially elongated shape having tool engaging projections.

4 Claims, 16 Drawing Figures

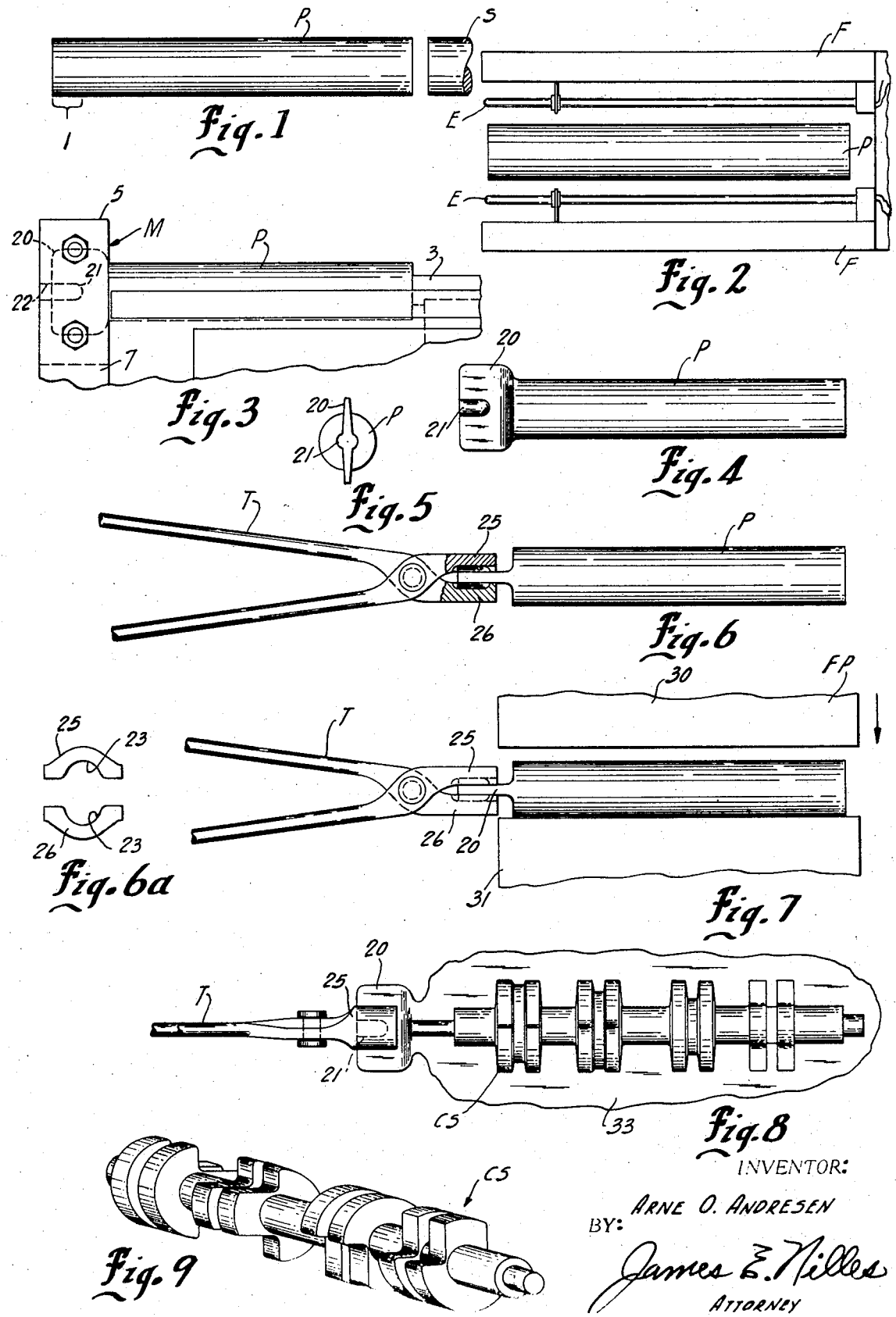

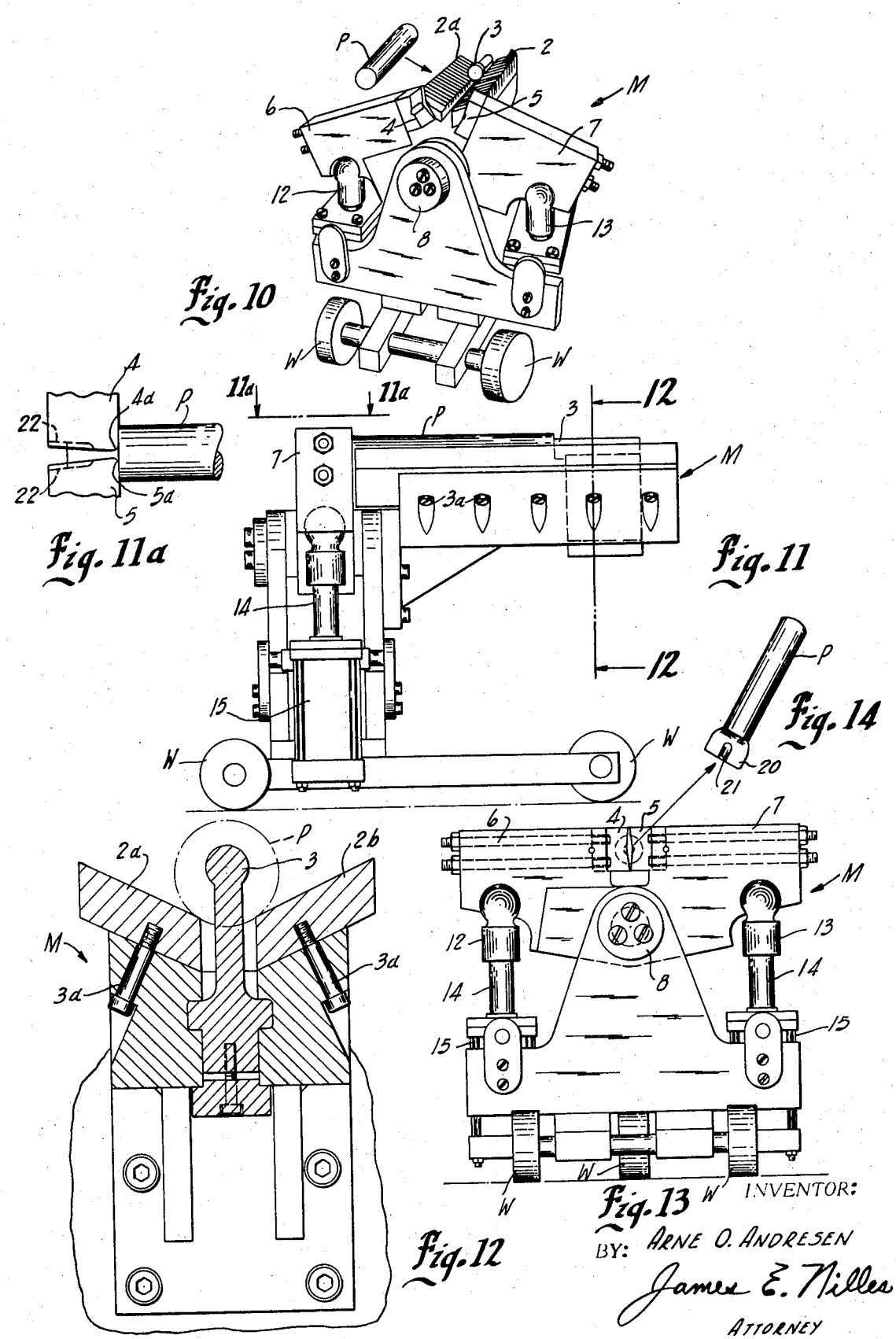

METHOD OF HANDLING METAL STOCK FOR HOT FORGING

BACKGROUND OF THE INVENTION

In the hot forging of metal, particularly of metal stock having considerable thickness or diameter, excessive waste of the material has heretofore been necessary in order to provide for handling of the plastic stock while in the forging press. In the prior art, either a piece of excessive length was necessarily used for each article to be finished, or an extra stub was welded onto the end of the piece, in order to provide a holding portion for the gripping tongs used to hold the piece while it was being forged.

These prior art methods were unsatisfactory because of the waste of material which was necessary in order to provide the gripping portion for the tongs, or, in the case where an extra stub was welded to the stock to be deformed, the welded stub would sometimes break off while the piece was being handled. While the welded stub technique did economize on the length of the piece to be used, that method was uncertain because of the likelihood of the stub breaking off, thereby often causing complete loss of the entire piece.

Because the metal to be forged is often very expensive, it is desirable to utilize only a length of material which is absolutely necessary to provide sufficient metal for the finished article.

SUMMARY OF THE INVENTION

The present invention provides a method for forming and handling a piece of metal so that economical use of the metal is assured in the hot forging of articles. More particularly, the present method includes the steps of cutting a length of metal from a piece of bar stock or the like, which length has only a minimum of excess length in addition to that required to form the finished article. This piece, which is cut off with a minimum length of excess material, is then heated to a plastic condition. The plastic piece is then deformed at one of its ends so that the minimum excess of length is not only flattened in a transverse direction, but is also axially elongated, say for example, to a length considerably more than that of the original excess length. The flattened and axially elongated end portion is at the same time preferably formed with projections, so that the deformed end portion can be positively and accurately grasped by a pair of tongs having complementary shaped jaws.

In one form of the invention, this deformation of the excessive length of the metal piece is accomplished by a squeezing action and while the piece is held against axial displacement. This insures that the excessive length of the material is accurately formed and without damage to the remainder of the piece. The holding portion so formed on the plastic piece is then grasped by the complementary shaped tongs and placed in a hammer or forging press for shaping to the desired form. This shaping may require repeated blows of the hammer or press and during this time the operator has firm and accurate control over the piece which is important in order to turn and maintain the piece in accurate positions in the forging press. After the forging operation, the holding portion of the piece is cut from the finished article.

With the above method, only a minimum amount of excessive length of metal is necessary in order to provide a good holding portion for the operator's tongs, thus effecting a considerable savings of metal.

Another aspect of the invention relates to the machine for deforming the end of the plastic piece into a tong-holding portion. This machine has an adjustable V-shaped table for accurately positioning the plastic piece relative to the squeezing jaws of the machine. Stop means are provided for the piece for preventing it from shifting axially in one direction while the squeezing jaws are performing their operation. The jaws are swingable by fluid power operated means from an open position for receiving the end of the piece and a closing position in which they have squeezed the end of the piece into the particular shaped jaws, thereby forming the end of the piece into a generally transversely flattened and axially elongated shape. Furthermore, the jaws are of such shape that they first contact the piece at a location where the excessive length of the piece joins the remainder of the piece thereby preventing the piece from shifting in the other direction as the closing jaws cause the material to be squeezed in an axial direction and into the particular shape formed by the jaws.

These and other objects and advantages of the present invention will appear hereinafter as this disclosure progresses, reference being had to the accompanying drawings.

BRIEF DESCRIPTION OF THE DRAWINGS

FIG. 1 shows a piece of metal to be forged and which has been cut from a bar stock;

FIG. 2 shows the metal being heated in a furnace of any suitable character to place the metal in a plastic condition;

FIG. 3 is a fragmentary view of a machine in which the end of the plastic metal piece is shaped to deform the excessive length thereof into a holding portion;

FIG. 4 is a view of the piece after it has been deformed at one end;

FIG. 5 is an end view of the piece shown in FIG. 4;

FIG. 6 shows the step of applying the complementary shaped tongs to the piece;

FIG. 6a is an end view of the jaws of the tongs shown in FIG. 6;

FIG. 7 shows the step of placing the piece in a forging press;

FIG. 8 shows the piece after it has been forged;

FIG. 9 is a perspective view of the finished piece, for example, a crankshaft;

FIG. 10 is a perspective view of the squeezing machine for forming the holding portion of the piece, a part of this machine also being shown in FIG. 3;

FIG. 11 is a side view of the machine shown in FIG. 10;

FIG. 11a is a fragmentary, plan view of the jaws of the machine as shown in FIG. 11, in the closed position;

FIG. 12 is an enlarged sectional view of the machine shown in FIG. 11, the view being taken along the line 12—12 in FIG. 11;

FIG. 13 is a front elevational view of the machine shown in FIG. 10, but showing the squeezing jaws in the fully closed, compressing position, certain parts being shown as removed for clarity in the drawings; and FIG. 14 is a view of the piece as it is removed from the machine of FIG. 13 after the jaws have again been opened, and this piece being the same as that shown in FIGS. 4 and 5.

DESCRIPTION OF A PREFERRED EMBODIMENT

The present invention finds particular utility in handling metal pieces for hot forging, which pieces are of substantial size that make them difficult to securely hold and accurately position in a hammer or press and while being manipulated in the press. These metals are often expensive and it is desirable only to use as short a piece as possible which will at the same time provide the necessary metal to form the finished article.

As shown in FIG. 1, a piece P is cut from a supply of stock S so that the piece includes a small length 1, for example of a length of ½ inch, and which length 1 is in excess of the length of the piece required to form the finished article. This minimum excess length 1 is too short to be grasped by the necessary holding tool, such as a pair of tongs T, to be referred to later.

This small minimum length of the piece is deformed, as will appear, so that it results in an axially elongated holding portion which is of a shape that provides a good grip for the tool T.

After the stock has been cut into the piece P with a minimum excess length 1, it is placed, by any suitable means, in a furnace F, which may, for example, include electric heating elements E that produce sufficient heat to cause the piece to become sufficiently plastic so it may be deformed under pressure by a machine to be referred to. After the piece has been so heated, it is removed from the furnace F and its end, namely the minimum length 1 of about ½ inch is deformed to provide a good holding portion as follows.

A particular machine M which has been provided to perform a squeezing action to deform the end has been shown in FIG. 3 and in FIGS. 10 to 13 inclusive. The machine includes wheel means W at the lower side of the machine frame. The piece P is laid on a V-shaped table 2 of the machine M and its one end abuts firmly against a fixed stop 3 in the table. The table 2 of the machine comprises a pair of downwardly converging, corrugated plates 2a and 2b which are fixed by screws 3a (FIGS. 12), to keep the metal piece P centered in the machine.

The other end 1 of the piece P extends between the jaws 4 and 5 of the machine, which are attached to swingable arms 6 and 7, respectively that in turn are pivoted about a center axis 8. The arms 6 and 7 can be swung from the open position, as shown in FIG. 10, to the fully closed position shown in FIG. 13, by their hydraulic cylinder and piston units 12 and 13, respectively. The hydraulic units are of conventional character and each include a piston 14 and a cylinder 15. In this manner, after the piece P is placed on the table 2 against the stop 3, the cylinder units are extended in the known manner to cause arms 6 and 7 to swing upwardly, consequently causing their jaws 4 and 5 to squeeze the excess length end of the plastic piece P, thereby deforming it into a shape such as shown in FIGS. 4 and 5. While the squeezing operation is taking place, piece P is prevented from shifting axially by the stop 3, thereby insuring that the end 1 of the piece is accurately formed in relation to the remainder of the piece.

In respect to the shape of the jaws 4 and 5, it will be noted that they are shaped to have an inner edge 4a and 5a which close on the piece P prior to the commencement of the deformation of the piece. This generally wedge shape of the jaws, when viewed in plan, insures that the piece does not "jump" out, that is shift axially in the direction away from the stop 3, when the jaws deform the end. Thus the stop 3 and the shape of the jaws 4 and 5 hold the piece from axially shifting as the jaws close. Closing of the jaws squeezes the end of the piece, causing it to flow in an axial direction into the remaining portion of the jaws.

The inner, opposed surface of the jaws are also formed of a particular shape so as to cause the end of the piece to be generally flattened in a transverse direction, and a projection 21 formed on the end, due to the recesses 22 in the jaws (FIG. 11a).

Thus, as shown particularly in FIGS. 4, 5 and 14, the deformed end is flattened in a transverse direction and thereby becomes wider than the original shape and the end is also axially elongated and has a pair of projections 21, one on each side, thereby forming a holding portion 20 for the piece P.

After the end has been so formed, the portion 20 of the piece P is grasped by a large pair of tongs T having jaws 25 and 26 with internal recesses 23 that complement the shape of the projections 21. Thereby, the jaws of the tongs can positively and securely grasp the piece P to prevent it from twisting relative to or dropping from the tongs. It will be appreciated that as the piece P is often of considerable weight and is furthermore subjected to considerable pounding and pressure while in the forging press, it is necessary that the piece be under accurate and absolute control of the operator at all times in order to insure the formation of an accurately formed finished part.

As shown in FIG. 7, the piece P is then inserted in the forging press FP where the upper die 30 for example, descends rapidly and with considerable pressure on the piece P thereby forming it into the desired shape as determined by the shape of the die 30 and the lower, opposed die 31. In forging the piece to the desired shape, it may be necessary for the operator to turn the piece to several different positions for subsequent strokes of the die 30, and while doing so the piece must be under accurate and positive control of the operator.

After the piece is formed, it is removed from the forging press and a certain amount of flash 33 which is usually relatively thin, is cut from the finished article, such as a crankshaft CS (FIG. 9). The holding portion 20 is also removed from the finished crankshaft CS.

RESUME

By means of the present invention, a piece of metal is cut from a bar stock with only a minimum excess length which is to be used for holding it.

The piece is then heated to a plastic condition and the end of excess length is formed to provide a desirable shape which can be grasped by a complementary holding tool. The piece which is then firmly grasped by the tool at the elongated and flattened holding portion is then placed in a forging device such as a press, drop hammer, or the like, for being formed as desired. After the piece has been formed, the elongated holding portion can be cut from the finished article. In this manner only a minimum amount of original bar stock is necessary to facilitate accurate and positive handling by the operator during the forging operation.

The machine provided by the present invention can accommodate different size pieces, prevents axial shifting of the piece while its end is being deformed into an axially elongated, transversely flattened holding portion having projecting means thereon. The machine jaws accurately exert a squeezing force only on the excess length on the end of the piece and into the desired shape.

I claim:

1. The method of forming and handling a piece of metal for hot forging thereof, said method comprising, cutting a piece of metal to a length in excess of that which is required to form the finished article but of a shorter axial length than is necessary to securely grasp said excess length by a handling tool; heating the piece to a plastic condition, deforming said excess length at one end of the piece including axially elongating said length into an end holding portion, grasping said end portion with a handling tool whereby a good holding engagement of said piece is obtained by said tool, inserting said piece while held by said tool into a forging device, causing the forging device to form the piece into a desired shape, removing the formed piece from the forging device, and then removing said holding portion from the formed piece.

2. The method of forming and handling a piece of metal for a hot forging operation thereon to produce a finished article, said method comprising, cutting a piece of metal to a length which includes only a minimum length in excess of that which is required to form the finished article but of a shorter axial length than is necessary to securely grasp said excess length by a handling tool, heating the piece to a plastic condition, deforming said excess length of metal at one end of the piece by squeezing said end to generally flatten transversely and axially elongate said end into a holding portion including projection means thereon, grasping said portion with a handling tool which has jaws that complement said projection means whereby a good holding engagement of said piece is obtained by said tool, inserting said piece while held by said tool into a forging device, causing the forging device to form the piece into a desired shape, removing the formed piece from the forging device, and then removing said holding portion from the formed piece.

3. The method of forming and handling a piece of metal for a hot forging operation thereon to produce a finished article, said method comprising, cutting a piece of metal to be forged to a length which includes only a minimum length in excess of that which is required to form the finished article but of a shorter axial length than is necessary to securely grasp said excess length by a handling tool, heating the piece to a plastic condition, deforming said excess length of metal at one end of the piece into a holding portion by squeezing and thereby deforming said end to generally flatten transversely and axially elongate said end into said holding portion having a holding projection on each side of said portion, grasping said portion with a handling tool which has jaws that complement said holding projections whereby a good holding engagement of said piece is obtained by said tool, inserting said piece while held by said tool into a forging device, causing the forging device to form the piece into an article of desired shape, removing the formed article from the forging device, and then removing said holding portion from the formed article.

4. The method of forming and handling a piece of metal for a hot forging operation thereon to produce a finished article, said method comprising, cutting a piece of metal to be forged to a length which includes only a minimum length in excess of that which is required to form the finished article but of a shorter axial length than is necessary to securely grasp said excess length by a handling tool, heating the piece to a plastic condition, placing said plastic piece in an end deforming machine having squeezing jaws, causing said jaws to close over one end of said piece containing said excess of length, forming said excess length by squeezing and thereby deforming it to generally flatten transversely and axially elongate it into a holding portion having projection means, grasping said portion with a handling tool which has jaws that complement said projection means whereby a good holding engagement of said piece is obtained by said tool, inserting said piece while held by said tool into a forging device, causing the forging device to form the piece into a desired shape, removing the formed piece from the forging device, and then removing said holding portion from the finished article.

* * * * *